W. A. MILLS.
ARMY FIELD KITCHEN.
APPLICATION FILED DEC. 2, 1914.

1,127,064.

Patented Feb. 2, 1915.
3 SHEETS—SHEET 1.

W. A. MILLS.
ARMY FIELD KITCHEN.
APPLICATION FILED DEC. 2, 1914.
1,127,064.
Patented Feb. 2, 19
3 SHEETS—SHEET 2
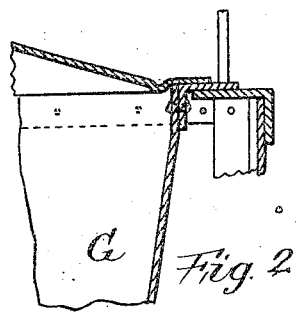
Fig. 2ᵃ
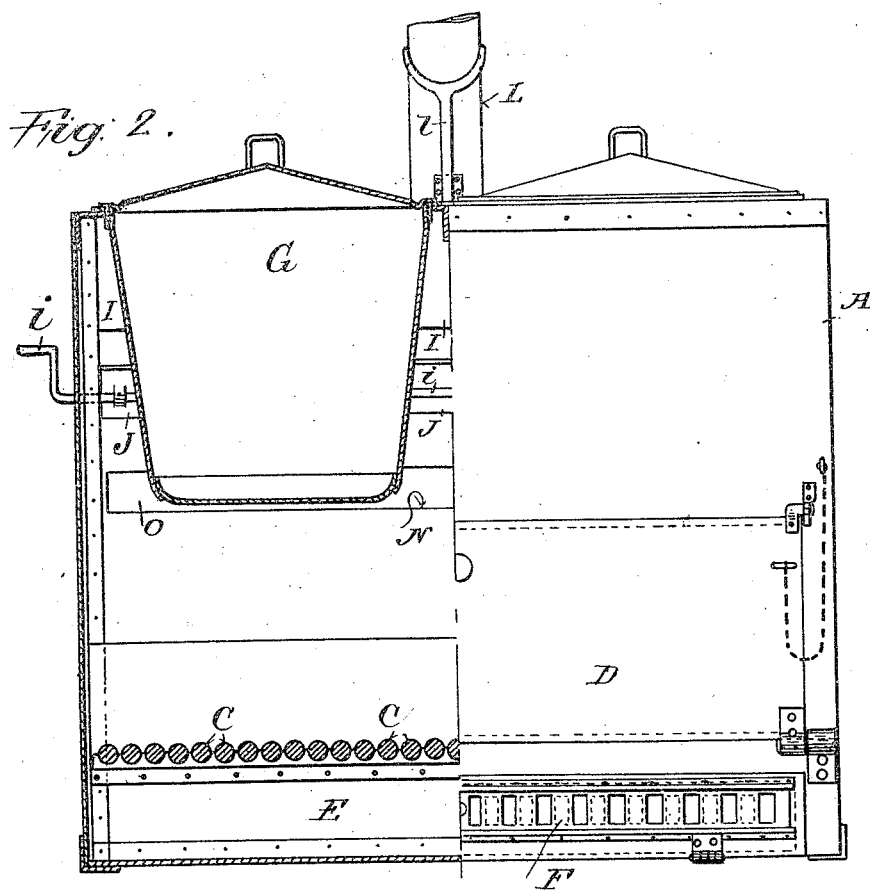
Fig. 2.
Witnesses:
Inventor
William A. Mills
By his Attorney
Clarkson A. Collins

W. A. MILLS.
ARMY FIELD KITCHEN.
APPLICATION FILED DEC. 2, 1914.

1,127,064.

Patented Feb. 2, 1915.
3 SHEETS—SHEET 3.

Witnesses.

Inventor
William A. Mills
By his Attorney
Clarkson A. Collins

UNITED STATES PATENT OFFICE.

WILLIAM A. MILLS, OF PORT CHESTER, NEW YORK, ASSIGNOR TO WILLIAM A. MILLS, JR., OF PORT CHESTER, NEW YORK.

ARMY FIELD-KITCHEN.

1,127,064.     Specification of Letters Patent.     Patented Feb. 2, 1915.

Application filed December 2, 1914. Serial No. 875,077.

*To all whom it may concern:*

Be it known that I, WILLIAM A. MILLS, a citizen of the United States, residing at Port Chester, in the county of Westchester and State of New York, have invented a new and Improved Army Field-Kitchen, of which the following is a specification.

My invention relates to a transportable cooking device, of the kind usually known as an army field-kitchen, particularly adapted to the preparation of food for troops on the march or in the field. The primary requirement of such a device is that it shall be adapted to the preparation in large quantities of a few varieties of food, such, *e. g.*, as a soup or stew, coffee and the baking of bread.

The object of my improvements is to provide a device that shall conform to this requirement and shall at the same time be simple and durable in construction and readily movable from place to place, and my invention consists in the construction and the combination and arrangement of parts directed to that end hereinafter described and claimed.

Figure 1:
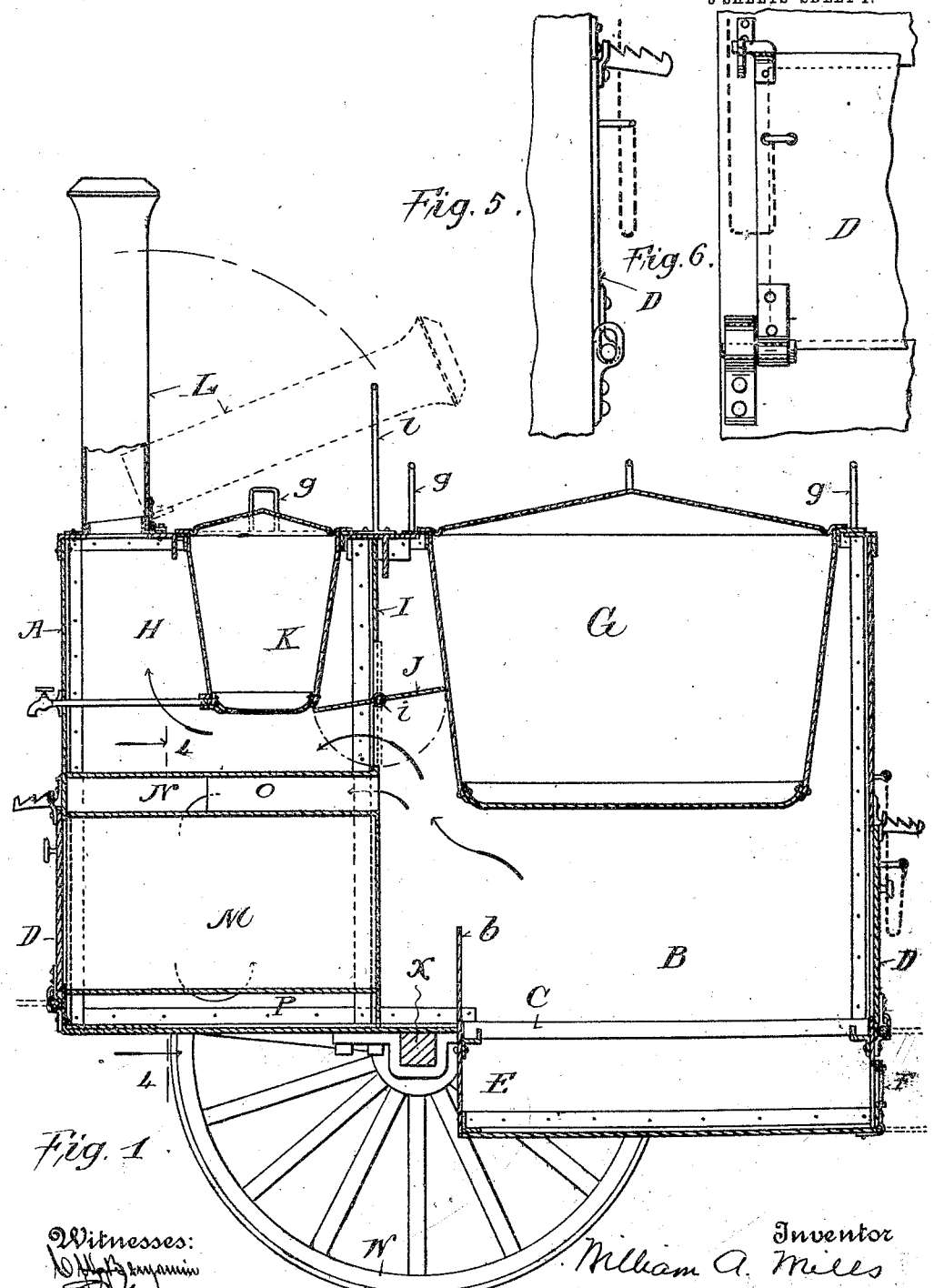
Figure 3:
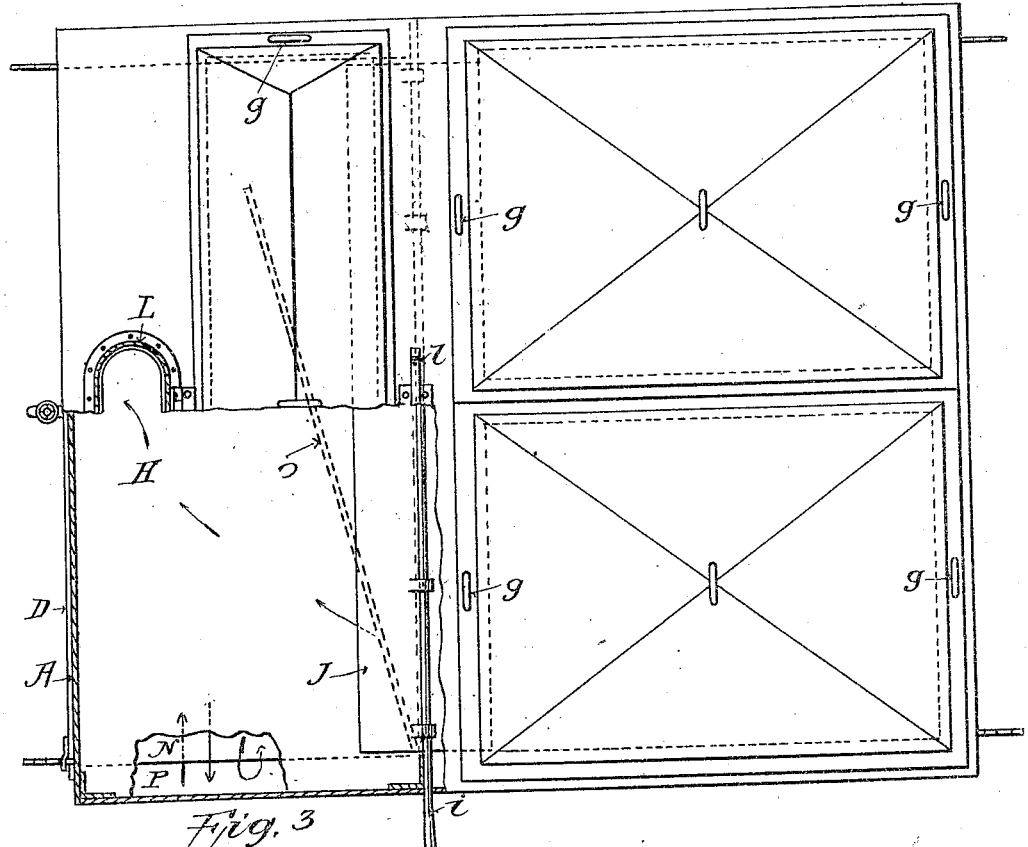
Figure 4:
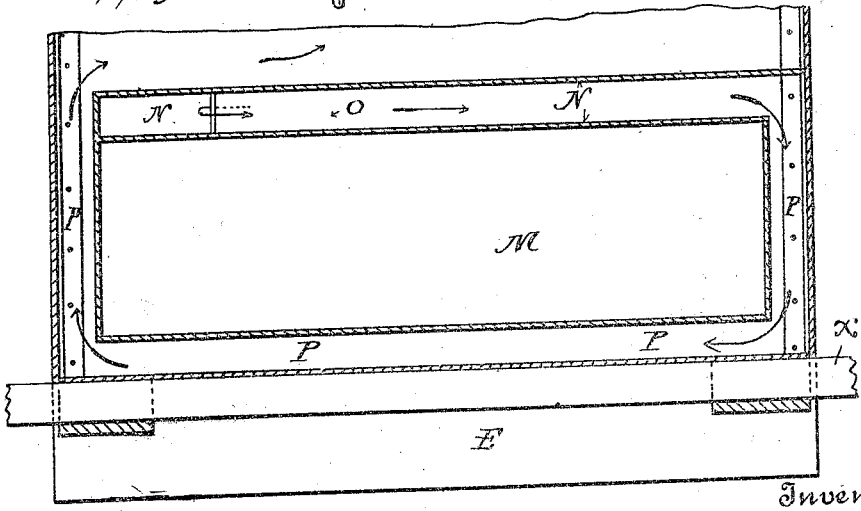

The invention will be best understood by reference to the accompanying drawings, illustrating an embodiment thereof, Figure 1 of which shows a vertical longitudinal section of the device. Fig. 2 shows a view of the same partly in end elevation and partly in transverse vertical section. Fig. 3 shows a top plan view partly broken away, Fig. 4 shows a vertical, transverse section on the line 4—4, Fig. 1, and Figs. 2ª, 5 and 6 show enlarged views of details of construction.

Referring to the drawings, A, indicates the exterior shell of the device consisting, essentially of a rectangular box of sheet iron suitably secured together. For the purpose of convenient transportation from place to place this is provided with wheels, W, carried on an axle, X, secured to the lower part thereof. One end of the case, A, constitutes the fire-box, or chamber, B, of the apparatus, extending from top to bottom of the case and provided at the bottom with grate bars, C, and having a door, D, for the introduction of fuel.

An ash pit, E, having a draft door or opening, F, is provided below the fire-box, B.

In the upper surface of the box, A, above the fire-box, B, are openings adapted to receive a cooking vessel or vessels, G, G. The vessels, G, G, are designed for the preparation of those foods such as soup or stews requiring the application of the greatest amount of heat and for this reason project downward into the fire-box, B, so that they are exposed to the full effect of the fire therein.

Adjoining the fire-box, B, in the upper portion of the box or case, A, and extending entirely across the same from side to side is a second chamber, H. The chamber, H, is separated from the fire-box, B, by a wall, I, in which is a damper, or valve, J, operable by handles, *i, i*, whereby communication between the fire-box, B, and the chamber, H, may be cut off. In the upper surface of the case, A, above the chamber, H, is an opening adapted to receive a vessel, K, which projects downward into the chamber, H, and is adapted and proportioned for the preparation of coffee. Both the fire-box, B, and the chamber, H, are made of very considerable depth as compared with corresponding parts in cooking devices heretofore known, so as to permit a very considerable downward projection into them of the vessels, G, and K. Thus the vessels present a large heat absorbing surface with consequent economy of fuel and rapidity in the cooking operation.

From the chamber, H, projects a chimney or smoke-pipe, L. The pipe, L, is preferably hinged at the bottom so that when the device is being moved from place to place it can be turned down, being supported when in this position in a crotch, *l*.

Below the chamber, H, is located a third chamber, M, constituting the oven of the apparatus. The oven, M, is separated from the chamber, H, by a space, N, which is open on one side to the fire-box, B, and is partially divided by a partition, or baffle plate, O, extending diagonally across it. The space, N, is connected at one end with a flue, P, which passes downward past one end of the oven, thence across the apparatus under the bottom of the oven and thence upward past the other end of the oven and into the chamber, H.

In order to prevent overheating of the oven by the direct action of the fire a baffle-plate, *b*, is preferably placed between the oven and the fire-box.

In using the device the damper, J, is at the outset opened so that the hot products of combustion pass from the fire-box, B, directly through the chamber, H, to the smoke-pipe, L. The contents of the larger vessels, G, G, which require the greatest amount of heat, are directly heated by the fire in the fire box while the contents of the smaller vessel, K, as coffee, are quickly brought to the boiling point by the passage of the hot products of combustion through the chamber, H. When the contents of the vessel, K, are heated to the desired point the damper, J, is closed and the products of combustion then pass through the space, N, around the baffle plate, O, and thence by the flue, P, past the ends and bottom of the oven into the chamber H, and to the smoke-pipe, L. Thus the oven already partially heated by the fire in the fire-box is brought to the temperature required for baking or roasting and at the same time the contents of the vessel, K, through the discharge of the products of combustion into the chamber, H, are kept heated until used. It will be evident that, if desired, the damper, J, may be closed at the outset so as to thoroughly and quickly heat the oven while the contents of the vessel, K, are being heated by the passage of the hot products of combustion after they have passed around the oven.

Preferably the vessel, K, is provided with a detachable spigot, k, through which the contents may be drawn off and both the vessel, K and the vessels, G, G, are provided with upwardly projecting handles, g, g, in which a pole may be readily inserted for the purpose of conveniently lifting and removing the vessels so as to facilitate access to their contents or permit of their being cleaned.

From the foregoing it will be evident that my invention provides a transportable cooking device economical in construction and simple in operation by means of which large quantities of food can be readily prepared, the advantages of which for the purposes indicated will be readily understood by those skilled in the art.

What I claim as new and desire to secure by Letters Patent, is:

1. A transportable cooking device having a fire-box located in one end thereof, a chamber adjacent said fire-box, a smoke pipe leading from said chamber, an oven located below said chamber and an open space interposed between said chamber and said oven.

2. In a transportable cooking device the combination of a fire-box, a chamber located adjacent said fire-box, a smoke pipe leading from said chamber, means for causing the products of combustion to pass directly through said chamber to the smoke pipe, an oven located below said chamber and means for shutting off direct access of the products of combustion to said chamber and causing them to pass around the oven.

3. In a transportable cooking device, the combination of a fire-box, a chamber located adjacent said fire-box, a smoke-pipe leading from said chamber, means for causing the products of combustion to pass directly through said chamber, an oven located below said chamber, and means for shutting off direct access of the products of combustion to said chamber and causing them to pass around the oven into said chamber.

4. In a transportable cooking device, the combination of a fire-box, a chamber located adjacent the fire box, an oven located below said chamber, an exit flue for the products of combustion and a flue whereby the products of combustion are caused to pass around the oven to said exit flue.

In testimony whereof, I have hereunto subscribed my name, this 28th day of November A. D., 1914.

WILLIAM A. MILLS.

Witnesses:
E. W. WYATT,
CLARKSON A. COLLINS.